United States Patent
Renard et al.

(10) Patent No.: US 10,235,996 B2
(45) Date of Patent: Mar. 19, 2019

(54) VOICE AND CONNECTION PLATFORM

(71) Applicant: XBrain, Inc., Menlo Park, CA (US)

(72) Inventors: Gregory Renard, Menlo Park, CA (US); Mathias Herbaux, Lille (FR)

(73) Assignee: Xbrain, Inc., Menlo Park, CA (US)

( * ) Notice: Subject to any disclaimer, the term of this patent is extended or adjusted under 35 U.S.C. 154(b) by 0 days.

(21) Appl. No.: 14/871,272

(22) Filed: Sep. 30, 2015

(65) Prior Publication Data

US 2016/0098992 A1  Apr. 7, 2016

Related U.S. Application Data

(60) Provisional application No. 62/058,508, filed on Oct. 1, 2014.

(51) Int. Cl.
| | |
|---|---|
| *G10L 15/22* | (2006.01) |
| *G10L 15/30* | (2013.01) |
| *G06F 3/16* | (2006.01) |
| *G10L 15/18* | (2013.01) |
| *G10L 15/24* | (2013.01) |

(52) U.S. Cl.
CPC .............. *G10L 15/22* (2013.01); *G06F 3/167* (2013.01); *G10L 15/18* (2013.01); *G10L 15/24* (2013.01); *G10L 15/30* (2013.01); *G10L 15/1822* (2013.01); *G10L 2015/223* (2013.01); *G10L 2015/226* (2013.01); *G10L 2015/227* (2013.01)

(58) Field of Classification Search
CPC .... G10L 15/22; G10L 2015/223; G10L 15/30
See application file for complete search history.

(56) References Cited

U.S. PATENT DOCUMENTS

| | | | | |
|---|---|---|---|---|
| 5,797,123 A | * | 8/1998 | Chou | G10L 15/18 704/240 |
| 6,192,339 B1 | * | 2/2001 | Cox | G10L 15/30 704/270 |
| 6,330,537 B1 | * | 12/2001 | Davis | H04N 5/44543 348/E5.105 |
| 6,442,519 B1 | * | 8/2002 | Kanevsky | G10L 15/07 704/243 |
| 7,149,695 B1 | * | 12/2006 | Bellegarda | G10L 15/1815 704/251 |
| 7,752,152 B2 | * | 7/2010 | Paek | G06F 17/276 706/20 |

(Continued)

FOREIGN PATENT DOCUMENTS

WO   2014130696   8/2014

OTHER PUBLICATIONS

International Search Report & Written Opinion for PCT Application No. PCT/US15/53251 dated Dec. 30, 2015, 12 pages.

(Continued)

*Primary Examiner* — Eric Yen
(74) *Attorney, Agent, or Firm* — Patent Law Works LLP

(57) ABSTRACT

A system and method for providing a voice assistant including receiving, at a first device, a first audio input from a user requesting a first action; performing automatic speech recognition on the first audio input; obtaining a context of user; performing natural language understanding based on the speech recognition of the first audio input; and taking the first action based on the context of the user and the natural language understanding.

18 Claims, 7 Drawing Sheets

(56) References Cited

U.S. PATENT DOCUMENTS

| | | | | |
|---|---|---|---|---|
| 8,165,886 B1* | 4/2012 | Gagnon | | G10L 15/19 |
| | | | | 704/275 |
| 8,332,218 B2* | 12/2012 | Cross, Jr. | | 704/231 |
| 8,406,384 B1* | 3/2013 | Tremblay | | H04M 3/51 |
| | | | | 379/67.1 |
| 8,453,058 B1* | 5/2013 | Coccaro | | G06Q 10/103 |
| | | | | 705/319 |
| 8,595,642 B1* | 11/2013 | Lagassey | | G06F 3/048 |
| | | | | 704/275 |
| 8,606,568 B1* | 12/2013 | Tickner | | G10L 15/1815 |
| | | | | 704/231 |
| 9,318,108 B2* | 4/2016 | Gruber | | G10L 15/1815 |
| 9,466,294 B1* | 10/2016 | Tunstall-Pedoe | | G10L 15/22 |
| 9,495,956 B2* | 11/2016 | Meisel | | G10L 15/22 |
| 2001/0047261 A1* | 11/2001 | Kassan | | G10L 15/30 |
| | | | | 704/270 |
| 2002/0133354 A1* | 9/2002 | Ross | | G10L 15/30 |
| | | | | 704/275 |
| 2002/0196911 A1* | 12/2002 | Gao | | H04M 1/271 |
| | | | | 379/88.03 |
| 2005/0086056 A1* | 4/2005 | Yoda | | G10L 15/24 |
| | | | | 704/246 |
| 2005/0209856 A1* | 9/2005 | Kii | | G06Q 10/02 |
| | | | | 704/270.1 |
| 2006/0206333 A1* | 9/2006 | Paek | | G10L 15/07 |
| | | | | 704/260 |
| 2007/0050191 A1 | 3/2007 | Weider et al. | | |
| 2008/0015864 A1* | 1/2008 | Ross | | G10L 15/1822 |
| | | | | 704/275 |
| 2008/0289002 A1 | 11/2008 | Portele et al. | | |
| 2009/0234635 A1* | 9/2009 | Bhatt | | G06F 17/289 |
| | | | | 704/2 |
| 2012/0016678 A1* | 1/2012 | Gruber | | G06F 17/3087 |
| | | | | 704/275 |
| 2012/0259633 A1* | 10/2012 | Aihara | | G10L 13/00 |
| | | | | 704/235 |
| 2013/0144616 A1* | 6/2013 | Bangalore | | G10L 15/1822 |
| | | | | 704/226 |
| 2013/0339022 A1* | 12/2013 | Baldwin | | G10L 15/22 |
| | | | | 704/257 |
| 2014/0038578 A1* | 2/2014 | Bouzid | | H04M 3/42204 |
| | | | | 455/418 |
| 2014/0136013 A1* | 5/2014 | Wolverton | | B60K 35/00 |
| | | | | 701/1 |
| 2014/0343950 A1* | 11/2014 | Simpson | | G06F 3/167 |
| | | | | 704/275 |
| 2015/0053781 A1* | 2/2015 | Nelson | | F24F 11/006 |
| | | | | 236/1 C |
| 2015/0162000 A1* | 6/2015 | Di Censo | | G10L 15/22 |
| | | | | 704/270.1 |
| 2015/0279366 A1* | 10/2015 | Krestnikov | | H04W 4/70 |
| | | | | 704/235 |
| 2015/0348548 A1* | 12/2015 | Piernot | | G10L 15/22 |
| | | | | 704/235 |

OTHER PUBLICATIONS

Extended European Search Report for EP Application No. 15846915.5, dated May 7, 2018, 8 pgs.

\* cited by examiner

VOICE AND CONNECTION PLATFORM

CROSS-REFERENCE TO RELATED APPLICATIONS

This application claims priority under 35 U.S.C. § 119(e) to U.S. Provisional Patent Application No. 62/058,508, filed on Oct. 1, 2014, entitled "Voice and Connection Platform" which is herein incorporated by reference in its entirety.

BACKGROUND

Present voice assistants include Apple's Siri, Google's Google Now and Microsoft's Cortana. A first problem with such present systems do not allow a user to interact with the personal assistant conversationally as the user would with a human. A second problem with such present systems is that the user is too often not understood or misunderstood or the present systems defaults quickly to a web search. A third problem with such present systems is that they are not proactive in assisting their user. A fourth problem is that such present systems are limited in the applications they interact with, for example, such voice assistants may only interact with a limited number of applications. A fifth problem is that such present systems do not utilize the user's context. A sixth problem is that such present systems do not integrate with other voice assistants.

SUMMARY

In one embodiment, the voice and connection engine provides a voice assistant that remedies one or more of the aforementioned deficiencies of existing voice assistants. In one embodiment, the voice and connection engine uses an agnostic and modular approach to one or more of the automatic speech recognition, natural language understanding and text to speech components thereby allowing frequent updates to those components as well as simplifying the adaptation of the system to different languages. In one embodiment, the voice and connection engine manages context in order to provide a more natural and human-like dialogue with the user and to increase the accuracy of the understanding of the user's requests and reduce the amount of time between receiving a request and executing on the request. In one embodiment, the voice and connection engine provides a work around to obtain a user's intended request rather than immediately defaulting to a web search. In one embodiment, the voice and connection engine utilizes modules to interact with various applications of the user device (e.g. phone, unified messenger, news, media, weather, browser for web search, etc.) and modules may be individually added or modified over time as applications are added and updated. In one embodiment, the modules for interacting with the applications provide a level of standardization in user commands. For example, a user may use the verbal request "send a message" to send a message via Facebook, email or twitter.

In one embodiment, the method includes receiving, at a first device, a first audio input from a user requesting a first action; performing automatic speech recognition on the first audio input; obtaining a context of user; performing natural language understanding based on the speech recognition of the first audio input; and taking the first action based on the context of the user and the natural language understanding.

Other aspects include corresponding methods, systems, apparatus, and computer program products for these and other innovative features. These and other implementations may each optionally include one or more of the following features. For instance, the operations further include: the first audio input is received responsive to an internal event. For instance, the operations further include: initiating a voice assistant without user input and receiving the first audio input from the user subsequent to the initiation of the voice assistant. For instance, the operations further include: the context including one or more of a context history, a dialogue history, a user profile, a user history, a location and a current context domain. For instance, the operations further include: subsequent to taking the action, receiving a second audio input from the user requesting a second action unrelated to the first action; taking the second action; receiving a third audio input from the user requesting a third action related to the first action, the third audio input missing information used to take the third action; obtaining the missing information using the context; and taking the third action. For instance, the operations further include: the missing information is one or more of an action, an actor and an entity. For instance, the operations further include: receiving, at a second device, a second audio input from the user requesting a second action related to the first action, the second audio input missing information used to take the second action; obtaining the missing information using the context; and taking the second action based on the context. For instance, the operations further include: determining that the context and the first audio input are missing information used to take the first action; determining what information is the missing information; and prompting the user to provide a second audio input supplying the missing information. For instance, the operations further include: determining that information used to take the first action is unable to be obtained from the first audio input; determining what information is the missing information; and prompting the user to provide a second audio input supplying the information unable to be obtained from the first audio input. For instance, the operations further include: determining that information used to take the first action is unable to be obtained from the first audio input; determining what information is missing from information used to take the first action; providing for selection by the user a plurality of options, an option supplying potential information for completing the first action; and receiving a second audio input selecting a first option from the plurality of options.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
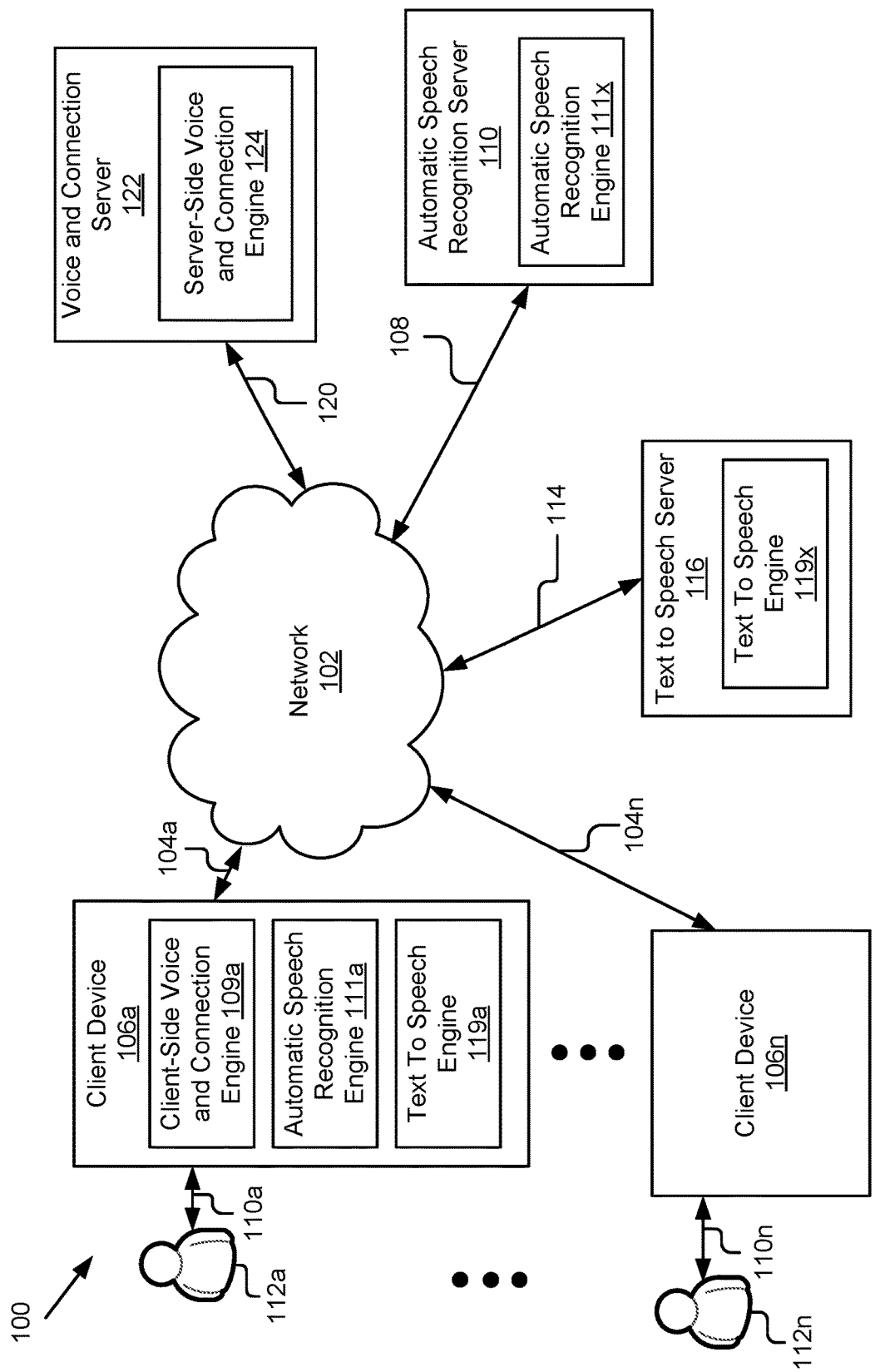
FIG. 1 is a block diagram illustrating an example system for voice and connection platform according to one embodiment.

FIG. 1 is a block diagram illustrating an example system 100 for a voice and connection platform according to one embodiment. The illustrated system 100 includes client devices 106a . . . 106n, an automatic speech recognition (ASR) server 110, a voice and connection server 122 and a text to speech (TTS) server 116, which are communicatively coupled via a network 102 for interaction with one another. For example, the client devices 106a . . . 106n may be respectively coupled to the network 102 via signal lines 104a . . . 104n and may be accessed by users 112a . . . 112n (also referred to individually and collectively as user 112) as illustrated by lines 110a . . . 110n. The automatic speech recognition server 110 may be coupled to the network 102 via signal line 108. The voice and connection server 122 may be coupled to the network 102 via signal line 120. The text to speech server 116 may be connected to the network 102 via signal line 114. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Comma Separated Values (CSV), Java DataBase Connectivity (JDBC), Open DataBase Connectivity (ODBC), etc. In addition, all or some of links can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks. Additionally, the data exchanged over network 102 may be compressed.

The client devices 106a . . . 106n (also referred to individually and collectively as client device 106) are computing devices having data processing and communication capabilities. While FIG. 1 illustrates two client devices 106, the present specification applies to any system architecture having one or more client devices 106. In some embodiments, a client device 106 may include a processor (e.g., virtual, physical, etc.), a memory, a power source, a network interface, and/or other software and/or hardware components, such as a display, graphics processor, wireless transceivers, keyboard, speakers, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, automobiles, robots, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices. For example, in one embodiment, the client device 106a is an automobile and client device 106n is a mobile phone.

In the depicted implementation, the client devices 106a includes an instance of a client-side voice and connection engine 109a, an automatic speech recognition engine 111a and a text to speech engine 119a. While not shown, client device 106n may include its own instance of a client-side voice and connection engine 109n, an automatic speech recognition engine 111n and a text to speech engine 119n. In one embodiment, an instance of a client-side voice and connection engine 109, an automatic speech recognition engine 111 and a text to speech engine 119 may be storable in a memory of the client device 106 and executable by a processor of the client device 106.

The text to speech (TTS) server 116, the automatic speech recognition (ASR) server 110 and the voice and connection server 122 may include one or more computing devices having data processing, storing, and communication capabilities. For example, these entities 110, 116, 122 may include one or more hardware servers, server arrays, storage devices, systems, etc., and/or may be centralized or distributed/cloud-based. In some implementations, these entities 110, 116, 122 may include one or more virtual servers, which operate in a host server environment and access the physical hardware of the host server including, for example, a processor, memory, storage, network interfaces, etc., via an abstraction layer (e.g., a virtual machine manager).

The automatic speech recognition (ASR) engine 111 performs automatic speech recognition. For example, in one embodiment, the ASR engine 111 receives an audio (e.g. voice) input and converts the audio into a string of text. Examples of ASR engines 111 include, but are not limited to, Nuance, Google Voice, Telisma/OnMobile, etc.

Depending on the embodiment, the ASR engine 111 may be on-board, off-board or a combination thereof. For example, in one embodiment, the ASR engine 111 is on-board and ASR is performed on the client device 106 by ASR engine 111a and ASR engine 111x and the ASR server 110 may be omitted. In another example, in one embodiment, the ASR engine 111 is off-board (e.g. streaming or relay) and ASR is performed on the ASR server 110 by ASR engine 111x and ASR engine 111a may be omitted. In yet another example, ASR is performed at both the client device 106 by ASR engine 111a and the ASR server 110 by the ASR engine 111x.

The text to speech (TTS) engine 119 performs text to speech. For example, in one embodiment, the TTS engine 119 receives text or other non-speech input (e.g. a request for additional information as discussed below with reference to the work around engine 328 of FIG. 3) and outputs human recognizable speech that is presented to the user 112 through an audio output of the client device 106. Examples of ASR engines 111 include, but are not limited to, Nuance, Google Voice, Telisma/OnMobile, Creawave, Acapella, etc.

Depending on the embodiment, the TTS engine 119 may be on-board, off-board or a combination thereof. For example, in one embodiment, the TTS engine 119 is on-board and TTS is performed on the client device 106 by TTS engine 119a and TTS engine 119x and the TTS server 116 may be omitted. In another example, in one embodiment, the TTS engine 119 is off-board (e.g. streaming or relay) and TTS is performed on the TTS server 116 by TTS engine 119x and TTS engine 119a may be omitted. In yet another example, TTS is performed at both the client device 106 by TTS engine 116a and the TTS server 116 by the TTS engine 116x.

Figure 3:
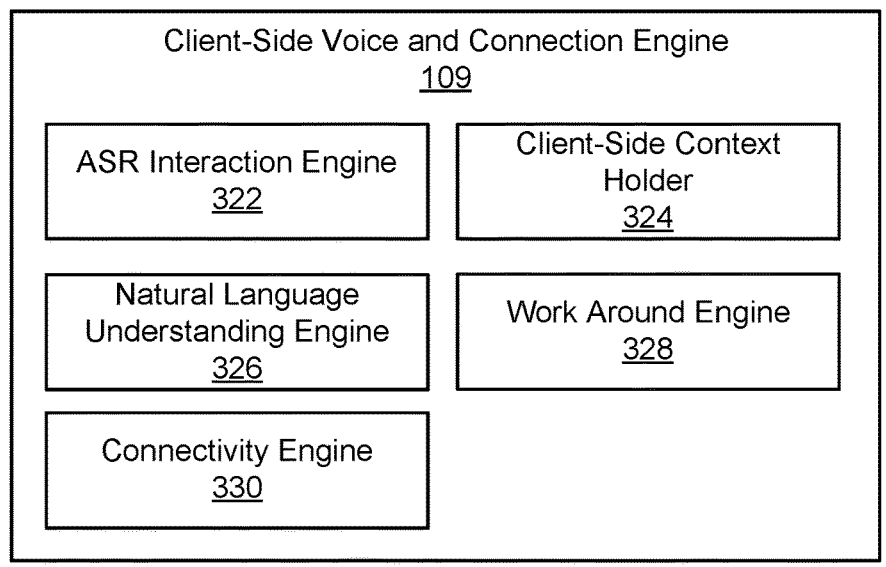
FIG. 3 is a block diagram illustrating an example of a client-side voice and connection engine according to one embodiment.
Figure 4:
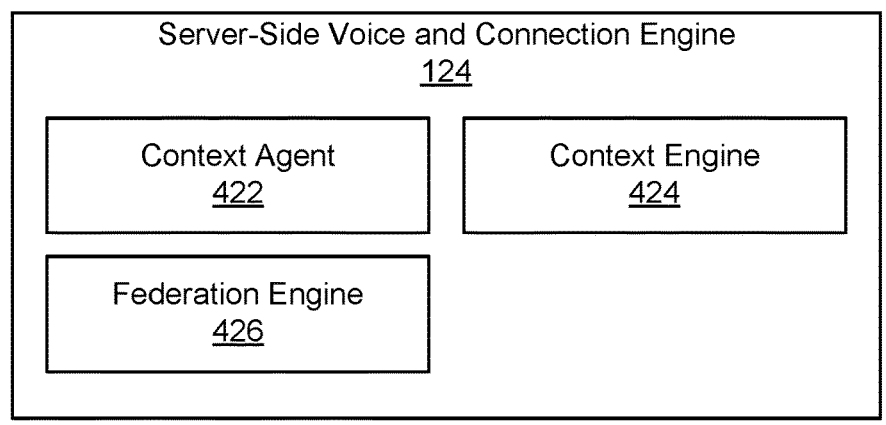
FIG. 4 is a block diagram illustrating an example of a server-side voice and connection engine according to one embodiment.

In the illustrated embodiment, the voice and connection engine is split into two components 109, 124; one client-side and one server-side. Depending on the embodiment, the voice and connection engine may be on-board, off-board or a hybrid of the two. In another example, in one embodiment, the voice and connection engine is on-board and the features and functionality discussed below with regard to FIGS. 3 and 4 are performed on the client device 106. In another example, in one embodiment, the voice and connection engine is off-board and the features and functionality discussed below with regard to FIGS. 3 and 4 are performed on the voice and connection server 122. In yet another example, in one embodiment, the voice and connection engine is a hybrid and the features and functionality discussed below with regard to FIGS. 3 and 4 are split between the client-side voice and connection engine 109 and the server-side voice and connection engine 124. Although it should be recognized that the features and functionality may be divided differently than the illustrated embodiments of FIGS. 3 and 4. In one embodiment, the voice and connection engine provides a voice assistant that uses context and artificial intelligence and provides natural dialog with a user 112 and can work around shortcomings in user requests (e.g. failure of voice recognition).

In one embodiment, the client-side (on-board) voice and connection engine 109 manages dialog and connects to the server-side (off-board) voice and connection platform 124 for extended semantic processing. Such an embodiment may beneficially provide synchronization to allow for loss and recover of connectivity between the two. For example, assume that the user is going through a tunnel and has no network 102 connectivity. In one embodiment, when the system 100 detects the lack of network 102 connectivity and analyzes the voice input (i.e. query/request) locally on the client device 106 using a "lite" local version of an automatic speech recognition engine 111 and natural language understanding engine 326 to execute, but when network 102 connectivity is available the ASR and Natural Language Understanding (NLU) are performed at server-side versions of those engines that provide greater semantics, vocabularies and processing abilities. In one embodiment, if the user's request requires network 102 connectivity, the system may verbally notify the user that it lacks network 102 connectivity the user's request will be processed when network 102 connectivity is re-established.

It should be understood that the system 100 illustrated in FIG. 1 is representative of an example system for speech and connectivity according to one embodiment and that a variety of different system environments and configurations are contemplated and are within the scope of the present disclosure. For instance, various functionality may be moved from a server to a client, or vice versa and some implementations may include additional or fewer computing devices, servers, and/or networks, and may implement various functionality client or server-side. Further, various entities of the system 100 may be integrated into to a single computing device or system or divided among additional computing devices or systems, etc.

Figure 2:
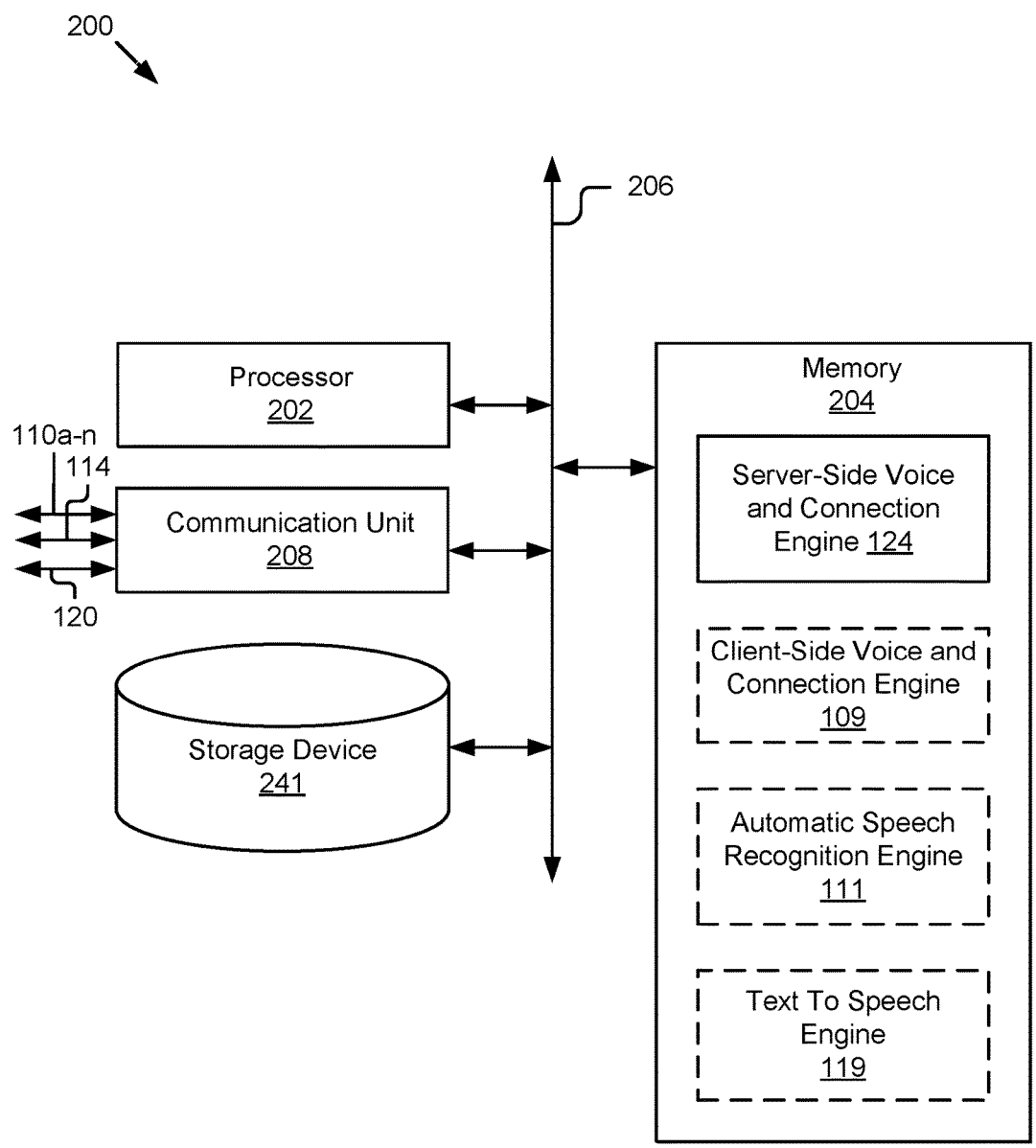
FIG. 2 is a block diagram illustrating an example computing device according to one embodiment.

FIG. 2 is a block diagram of an example computing device 200 according to one embodiment. The computing device 200, as illustrated, may include a processor 202, a memory 204, a communication unit 208, and a storage device 241, which may be communicatively coupled by a communications bus 206. The computing device 200 depicted in FIG. 2 is provided by way of example and it should be understood that it may take other forms and include additional or fewer components without departing from the scope of the present disclosure. For example, while not shown, the computing device 200 may include input and output devices (e.g., a display, a keyboard, a mouse, touch screen, speakers, etc.), various operating systems, sensors, additional processors, and other physical configurations. Additionally, it should be understood that the computer architecture depicted in FIG. 2 and described herein can be applied to multiple entities in the system 100 with various modifications, including, for example, the TTS server 116 (e.g. by including the TTS engine 119 and omitting the other illustrated engines), a ASR server 110 (e.g. by including an ASR engine 111 and omitting the other illustrated engines), a client device 106 (e.g. by omitting the server-side voice and connection engine 124) and a voice and connection server 122 (e.g. by including the server-side voice and connection engine 124 and omitting the other illustrated engines).

The processor 202 comprises an arithmetic logic unit, a microprocessor, a general purpose controller, a field programmable gate array (FPGA), an application specific integrated circuit (ASIC), or some other processor array, or some combination thereof to execute software instructions by performing various input, logical, and/or mathematical operations to provide the features and functionality described herein. The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the application server 122 including, for example, the memory 204, communication unit 208, and the storage device 241.

The memory 204 may store and provide access to data to the other components of the computing device 200. In some implementations, the memory 204 may store instructions and/or data that may be executed by the processor 202. For example, as depicted, the memory 204 may store one or more engines 109, 111, 119, 124. The memory 204 is also capable of storing other instructions and data, including, for example, an operating system, hardware drivers, software applications, databases, etc. The memory 204 may be coupled to the bus 206 for communication with the processor 202 and the other components of the computing device 200.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 204 may be a single device or may include multiple types of devices and configurations.

The bus 206 can include a communication bus for transferring data between components of the computing device or between computing devices 106/110/116/122, a network bus system including the network 102 or portions thereof, a processor mesh, a combination thereof, etc. In some implementations, the engines 109, 111, 119, 124, their subcomponents and various software operating on the computing device 200 (e.g., an operating system, device drivers, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSL, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network 103, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols, including, for example, those discussed elsewhere herein.

The storage device 241 is an information source for storing and providing access to data. In some implementations, the storage device 241 may be coupled to the components 202, 204, and 208 of the computing device via the bus 206 to receive and provide access to data. The data stored by the storage device 241 may vary based on the computing device 200 and the embodiment. For example, in one embodiment, the storage device 241 of a client device 106 may store information about the user's current context and session and the storage device 241 of voice and connection server 122 stores medium and long term contexts, aggregated user data used for machine learning, etc.

The storage device 241 may be included in the computing device 200 and/or a storage system distinct from but coupled to or accessible by the computing device 200. The storage device 241 can include one or more non-transitory computer-readable mediums for storing the data. In some implementations, the storage device 241 may be incorporated with the memory 204 or may be distinct therefrom. In some implementations, the storage device 241 may include a database management system (DBMS) operable on the application server 122. For example, the DBMS could include a structured query language (SQL) DBMS, a NoSQL DMBS, various combinations thereof, etc. In some instances, the DBMS may store data in multi-dimensional tables comprised of rows and columns, and manipulate, i.e., insert, query, update and/or delete, rows of data using programmatic operations.

As mentioned above, the computing device 200 may include other and/or fewer components. Examples of other components may include a display, an input device, a sensor, etc. (not shown). In one embodiment, the computing device includes a display. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user 112, etc. For example, the display may be a capacitive touch-screen display capable of detecting and interpreting multiple points of contact with the display surface.

The input device (not shown) may include any device for inputting information into the application server 122. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In one embodiment, the computing device 200 may represent a client device 106 and the client device 106 includes a microphone for receiving voice input and speakers for facilitating text-to-speech (TTS). In some implementations, the input device may include a touch-screen display capable of receiving input from the one or more fingers of the user 112. For example, the user 112 could interact with an emulated (i.e., virtual or soft) keyboard displayed on the touch-screen display by using fingers to contacting the display in the keyboard regions.

Example Client-Side Voice and Connection Engine 109

Referring now to FIG. 3, a block diagram of an example client-side voice and connection engine 109 is illustrated according to one embodiment. In the illustrated embodiment, the client-side voice and connection engine 109 comprises an automatic speech recognition (ASR) engine 322, a client-side context holder 324, a natural language understanding (NLU) engine 326, a work around engine 328 and a connection engine 330.

The automatic speech recognition (ASR) interaction engine 322 includes code and routines for interacting with an automatic speech recognition (ASR) engine 111. In one embodiment, the ASR interaction engine 322 is a set of instructions executable by the processor 202. In another embodiment, the ASR interaction engine 322 is stored in the memory 204 and is accessible and executable by the processor 202. In either embodiment, the ASR interaction engine 322 is adapted for cooperation and communication with the processor 202, an ASR engine 111, and other components of the system 100.

The ASR interaction engine 322 interacts with an ASR engine 111. In one embodiment, the ASR engine 111 is local to the client device 106. For example, the ASR interaction engine 322 interacts with an ASR engine 111 that is an on-board ASR application such as ASR engine 111a. In one embodiment, the ASR engine 111 is remote from the client device 106. For example, the ASR interaction engine 322 interacts with an ASR engine 111 that is an off-board ASR application accessible and used via network 102 such as ASR engine 111x. In one embodiment, the ASR engine 111 is a hybrid including components both local to and remote from the client device 106. For example, the ASR interaction engine 322 interacts with an off-board ASR engine 111x when the client device 106 has network 102 connectivity in order to reduce the processing burden on the client device 106 and improve the battery life thereof and interacts with an on-board ASR engine 111a when network 102 connectivity is unavailable or insufficient.

In one embodiment, the ASR interaction engine 322 interacts with the ASR engine 111 by initiating the voice input of the ASR engine 111. In one embodiment, the ASR interaction engine 322 may initiate the voice input of the ASR engine 111 responsive to detecting one or more events. In some embodiments, the ASR interaction engine 322 initiates the ASR proactively, without waiting for the user 112 to begin the dialog. Examples of events include, but are not limited to, a wake-up word or phrase, an expiration of a timer, user input, an internal event, an external event, etc.

In one embodiment, the ASR interaction engine 322 initiates the voice input of the ASR engine 111 responsive to detecting a wake-up word or phrase. For example, assume the voice and connection platform is associated with a persona to interact with users and the persona is named "Sam;" in one embodiment, the ASR interaction engine 322 detects when the word "Sam" is received via a client device's microphone and initiates voice input for the ASR engine 111. In another example, assume the phrase "Hey you!" is assigned as a wake-up phrase; in one embodiment, the ASR interaction engine 322 detects when the phrase "Hey you!" is received via a client device's microphone and initiates voice input for the ASR engine 111.

In one embodiment, the ASR interaction engine 322 initiates the voice input of the ASR engine 111 responsive to detecting an expiration of a timer. For example, the system 100 may determine that a user wakes up at 7 AM and leaves work at 6 PM; in one embodiment, sets a timer for 7 AM and a timer for 6 PM and the ASR interaction engine 322 initiates the voice input for the ASR engine 111 at those times. For example, so the user may request news or weather when waking up at 7 AM and may request a traffic report or to initiate a call to his/her spouse when leaving work at 6 PM.

In one embodiment, the ASR interaction engine 322 initiates the voice input of the ASR engine 111 responsive to detecting a user input. For example, the ASR interaction engine 322 initiates the voice input of the ASR engine 111 responsive to detecting a gesture (e.g. a specific swipe or motion on a touch screen) or button (physical or soft/virtual) selection (e.g. selecting a dedicated button or long-pressing a multi-purpose button). It should be recognized that the button referred to may be on the client device 106 or a component associated with the client device 106 (e.g. dock, cradle, Bluetooth headset, smart watch, etc.)

In one embodiment, the ASR interaction engine 322 initiates the voice input of the ASR engine 111 responsive to detecting an internal event. In one embodiment, the internal event is based on a sensor of the client device 106 (e.g. GPS, accelerometer, power sensor, docking sensor, Bluetooth antenna, etc.). For example, the ASR interaction engine 322 initiates the voice input of the ASR responsive to detecting that the user device 106 is located in the user's car (e.g. detects on board diagnostics of car, power and connection to in-car cradle/dock etc.) and initiates the voice input of the ASR engine 111 (e.g. to receive a user's request for navigation directions or music to play). In one embodiment, the internal event is based on an application (not shown) of the client device 106. For example, assume the client device 106 is a smart phone with a calendar application and the calendar application includes an appointment for the user at a remote location; in one embodiment, the ASR initiates the voice input of the ASR engine responsive to detecting the appointment (e.g. to receive a user's request for directions to the appointment's location). In one embodiment, the internal event is based on an operation of a local text to speech engine 119a. For example, assume the text to speech engine 119 operates in order to present a contextual prompt (e.g. "It appears you are leaving work would you like to call your wife and navigate home?"), or other prompt, to the user; in one embodiment, the ASR interaction engine 322 detects the text-to-speech prompt and initiates the voice input of the ASR engine 111 to receive the user's response to the prompt.

In one embodiment, the ASR interaction engine 322 initiates the voice input of the ASR engine 111 responsive to detecting an external event (e.g. from a third party API or database). In one embodiment, the internal event is based on an operation of a remote text to speech engine 119x. For example, assume the text to speech engine 119 operates in order to present a contextual prompt (e.g. "It appears you are leaving work would you like to call your wife and navigate home?," or "you are approaching your destination would you like me to direct you to available parking?"), or other prompt, to the user; in one embodiment, the ASR interaction engine 322 detects the text-to-speech prompt and initiates the voice input of the ASR engine 111 to receive the user's response to the prompt.

In one embodiment, the ASR interaction engine 322 is agnostic. For example, in one embodiment, the ASR interaction engine 322 may use one or more different ASR engines 111. Examples of ASR engines 111 include, but are not limited to, Nuance, Google Voice, Telisma/OnMobile, Creawave, Acapella, etc. An agnostic ASR interaction engine 322 may beneficially allow flexibility in the ASR engine 111 used and the language of the ASR engine 111 and may allow the ASR engine(s) 111 used to be changed through the life-cycle of the voice and connection system 100 as new ASR engines 111 become available and existing ASR engines are discontinued. In some embodiments, the system 100 includes multiple ASR engines and the ASR engine 111 used depends on the context. For example, assume Google Voice provides better recognition of proper names than Nuance; in one embodiment, the ASR interaction engine 322 may interact with the Google Voice ASR when it is determined that the user has accessed the contact list of a phone application. In some embodiments, the system 100 may switch between the ASR engines at any time (e.g. process a first portion of a voice input with a first ASR engine 111 and a second portion of the voice input with a second ASR 111). Similar to the ASR engine 111, in one embodiment, the system 100 is agnostic with respect to the TTS engine 119 used. Also similar to the ASR engine 111, in some embodiments, the system 100 may include multiple TTS engines 119 and may select and use different TTS engines for different contexts and/or may switch between different TTS engines at any time. For example, in one embodiment, the system 100 may begin reading a headline in English and the user may request French and the system will transition to a English to French TTS engine.

The ASR engine 111 receives the voice input subsequent to the ASR interaction engine 322 initiating the voice input. In one embodiment, responsive to initiation, the ASR engine 111 receives the voice input without additional involvement of the ASR interaction engine 322. In one embodiment, subsequent to initiating the voice input, the ASR interaction engine 322 passes the voice input to the ASR engine 111. For example, the ASR interaction engine 322 is communicatively coupled to an ASR engine 111 to send the voice input to the ASR engine 111. In another embodiment, subsequent to initiating the voice input, the ASR interaction engine 322 stores the voice input in a storage device (or any other non-transitory storage medium communicatively accessible), and the voice input may be retrieved by the ASR engine 111 by accessing the storage device (or other non-transitory storage medium).

In some embodiments, the system 100 proactively provides an electronic voice assistant without receiving user input such as voice input. For example, in one embodiment, the system 100 may determine the car (i.e. a client device 106 is in a traffic jam and automatically initiates TTS and begins a dialog with the user (e.g. "Would you like me to provide an alternate route?"), or performs an action (e.g. determines alternate route such as parking and taking the train and updates the navigation route accordingly).

The client-side context holder 324 includes code and routines for context synchronization. In one embodiment, context synchronization includes managing the definition, usage and storage of the context workflow from the client-side and sharing the context workflow with the server-side. In one embodiment, the client-side context holder 324 is a set of instructions executable by the processor 202. In another embodiment, the client-side context holder 324 is stored in the memory 204 and is accessible and executable by the processor 202. In either embodiment, the client-side context holder 324 is adapted for cooperation and communication with the processor 202, other components of the client device 106 and other components of the system 100.

The client-side context holder 324 manages the definition, usage and storage of the context workflow from the client-side and shares the context workflow with the server-side. In one embodiment, the client-side context holder 324 communicates with the context agent 420 (server-side context holder) using a context synchronization protocol in order to synchronize the context within the system 100 despite itinerancy and low capacity on the network 102 (which may be particularly beneficial on some networks, e.g., a mobile data network).

The client side context holder 324 manages the definition, usage and storage of the context. The context is the current status of the personal assistant provided by the voice and connection engine. In one embodiment, the context comprises one or more parameters. Examples of parameters include, but are not limited to, context history, dialog history (e.g. the user's previous requests and the system's previous responses and actions), user profile (e.g. the user's identity and preferences), user history (e.g. user's habits), location (client device's 106 physical location), current context domain (e.g. client device 106, application(s) being used, interface presently presented to user). In some embodiments, a parameter may be a variable or a serialized object.

In one embodiment, the context is a multi-dimensional context and can describe any dimensional variable or feature. In some embodiments, the context uses a multi-dimensional matrix. As is described herein, in some embodiments, the context is synchronized in real-time between the client-side (e.g. client device 106a) and the server-side (e.g. voice and connection server 122). Because of the combination of the deep integration of the synchronization in both parts of the platform (client and server) and the context's ability to describe any dimensional variable or feature, the context may occasionally be referred to as a "Deep Context."

Depending on the embodiment, the context is used by the system 100 to provide one or more benefits including, but not limited to, increasing the system's 100 ability to accurately recognize words from speech, determine a user's intended request and facilitate more natural dialog between the user 112 and the system 100.

In one embodiment, the context is used to more accurately recognize words from speech. For example, assume the user has the phone application open; in one embodiment, the context may be used (e.g. by the NLU engine 326 during preprocessing) to limit the dictionary used by the natural language understanding engine 326 (e.g. to names of contacts and words associated with operating a phone or conducting a call). In one embodiment, such dictionary limitation may beneficially eliminate "Renault" the car company but leave "Renaud" the name so that the NLU engine 326 may accurately determine that the user wants to call Renaud and not Renault. The NLU engine 326 may even determine which Renaud the user intends to call (assuming multiple contacts named Renaud) based on previous phone calls made by the user. Therefore, the preceding example also demonstrates an embodiment in which the context is used to more accurately determine the user's intended request (i.e. to call Renaud). Accordingly, the context may also minimize the amount of time from receiving the user's request to accurately executing on the request.

In one embodiment, the context is used to facilitate more natural dialog (bi-directional communication) between the user and the system 100. For example, context may be used to facilitate a dialog where the user requests news about Yahoo!; the system begins reading headlines of articles about Yahoo!. The user asks "who is the CEO?"; the system 100 understands that the user's intended request is for the CEO of Yahoo! and searches for and provides that name. The user then asks for today's weather; the system 100 understands that this request is associated with a weather application, and that the user's intended request is for the weather for the user's physical location determines that the a weather application should be used and makes an API call to the weather application to obtain the weather. The user then says "and tomorrow"; the system 100 understands that the user's intended request is for the weather at the user's present location tomorrow. The user then asks "what's the stock trading at?"; the system 100 understands the user's intended request is for the present trading price of Yahoo! stock and performs a web search to obtain that information. To summarize and simplify, in some embodiments, the context may track the topic, switch between applications and track a state in the work flows of the various applications to enable a more "natural" dialogue between the user 112 and the system 100 by supporting such context jumping.

In some embodiments, machine learning is applied to contexts. For example, to learn a probability of a next step or command based on data aggregated from numerous users and how users in general interact with the system 100 or for a particular user based on that user's data and how that user interacts with the system 100.

In one embodiment, the client side context holder 324 synchronizes the user's present context with the context agent 420 of FIG. 4. Synchronizing the context with the server-side voice and connection engine 124 allows the client-side voice and connection engine 109 to optionally have the server-side engine 124 manage the dialog and perform the various operations or to perform the functions at the client device 106 based on, e.g., connectivity to the server 122.

In one embodiment, the client-side holder 324 and context agent 420 (i.e. server-side holder) communicate using a context synchronization protocol that provides a communication protocol as well as verify that the context information being synchronized is delivered. In one embodiment, the context synchronization protocol standardizes key access (e.g. a context ID) for each property (e.g. variable or parameter) of the status or sub-status of the current context.

Figure 8:
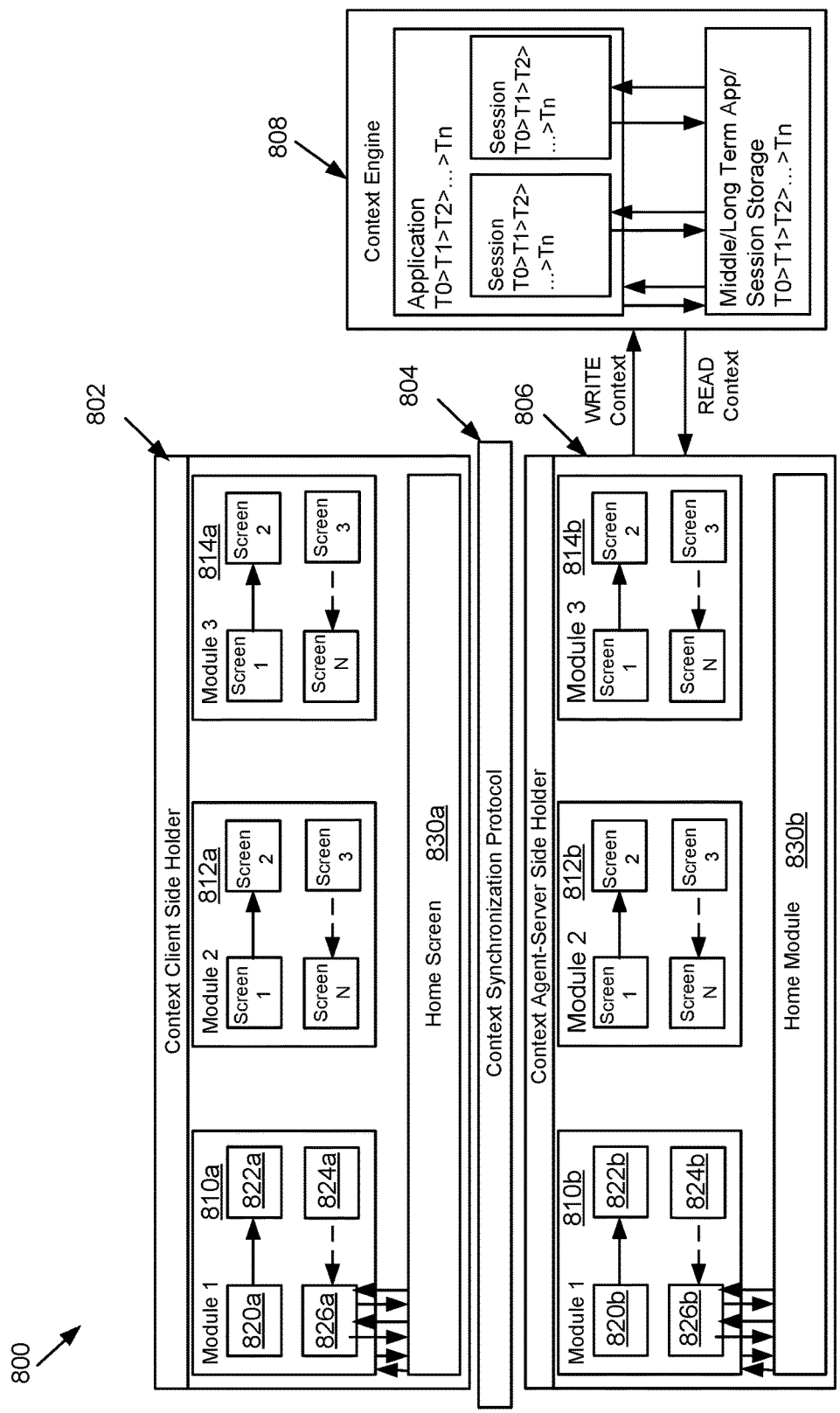
FIG. 8 is block diagram of an example of managing a context in the voice and connection platform according to one embodiment.

Referring now to FIG. 8, a schematic 800 providing further detail regarding the synchronization of context between client-side and server-side is shown according to one embodiment. In the illustrated embodiment, the client-side context holder 324 of the client device maintains one or more contexts 810*a*/812*a*/814*a* of the client device 106. In one embodiment, each context 810*a*/812*a*/814*a* is associated with a module. In one embodiment, the client-side context holder 324 maintains a context that includes the screens (Screen 1 thru N) that comprise the user's flow through the application's functionality and the functions available on each screen. For example, in the illustrated embodiment, the user was presented Screen 1 820*a*, which provided a set of functionality and the user selected a function (from F1-Fn of Screen 1). The user was then presented Screen 2 where the user selected a function (from F1-Fn of Screen 2). The user was then presented Screen 3 where the user selected a function (from F1-Fn of Screen 3) and so on. For example, in one embodiment, assume Module 1 810*a* is the module for a phone application and Module 2 812*a* is a module for a media application; in one embodiment, screens 820*a*, 822*a*, 824*a* and 826*a* of Module 1 810*a* may represent the user's dialog with the system to navigate a work around (discussed below) in order to select a contact and place a call and the screens of Module 2 812*a* may represent the flow of a user navigating a genre, artist, album and track to be played.

The Home Screen 830*a* resets the contexts of the various modules 810*a*, 812*a*, 814*a*. For example, assume that Module 1 810 is associated with a news application; in one embodiment, the user is directed to a home screen 830*a* (e.g. automatically by a mechanism such as a time out period or based on a user's request). In one embodiment, when the user is directed to the Home Screen 830*a* a reset of context information in one or more of the modules 810*a*, 812*a*, 814*a* is triggered.

In one embodiment, the context synchronization protocol 804, which is also described below with reference to FIG. 4, provides a protocol for communicating the contexts from the client-side context holder 324 to the context agent 422 also referred to as the server-side context holder or similar. In some embodiments, the context synchronization protocol provides a high degree of compression. In some embodiments, the context synchronization protocol provides a mechanism for verifying that contexts are successfully synchronized between the client and server sides such that the information 806 of the context agent 422 is identical to that 802 of the client-side context holder 324.

In one embodiment, the context engine 424 collects the contexts from the context agent 422. In one embodiment, the context engine 424 manages context information 808 for a user. For example, the context agent 422 maintains context information (e.g. long term and middle term contexts) for an application over time and the various context information for each user session in an application. Such information may be useful for machine learning (e.g. predicting a user's intent based on present context such as a requested to call Victoria and past contexts such as the last request for a Victoria being for a Victoria P.

In one embodiment, the client-side context holder 324 passes the context to one or more components of the system 100 including, e.g., the natural language understanding (NLU) engine 326 and/or the context agent 422. In one embodiment, the client-side context holder 324 stores the context in the storage device 241 (or any other non-transitory storage medium communicatively accessible). The other components of the system 100 including, e.g., the natural language understanding engine 326 and/or the context agent 422, can retrieve the context by accessing the storage device 241 (or other non-transitory storage medium).

The natural language understanding (NLU) engine 326 includes code and routines for receiving the output of the ASR engine 111 and determining a user's intended request based on the output of the ASR engine 111. In one embodiment, the NLU engine 326 is a set of instructions executable by the processor 202. In another embodiment, the NLU engine 326 is stored in the memory 204 and is accessible and executable by the processor 202. In either embodiment, the NLU engine 326 is adapted for cooperation and communication with the processor 202, the ASR engine 111 and other components of the system 100.

In one embodiment, the NLU engine 326 preprocesses the ASR engine 111 output to correct an error in the speech recognition. For clarity and convenience, the output of the ASR engine 111 is occasionally referred to as the "recognized speech." In one embodiment, the NLU engine 326 preprocess the recognized speech to correct any errors in the recognized speech. In one embodiment, the NLU engine 326 receives the recognized speech and, optionally, the associated confidences from the ASR engine 111 and receives a context from the client-side context holder 324 and corrects any misrecognized terms in the recognized speech. For example, assume the user speaks French and the voice input is "donne-moi l'information technologique" (i.e. "give me information technology"); however, the ASR engine 111 outputs "Benoit la formation technologique" (i.e. "Benoit technology training") as recognized speech. In one embodiment, the NLU engine 326 performs preprocessing based on context to correct "Benoit" to "donne-moi" and "formation" to "information," thereby increasing the accuracy of the NLU engine's 326 subsequently determined user intent.

The NLU engine 326 determines the user's intent based on the recognized speech from the ASR engine 111, which may optionally be preprocessed in some embodiments. In one embodiment, the NLU engine 326 determines a user's intent as a tuple. In one embodiment, a tuple includes an action (e.g. a function to be performed) and an actor (e.g. a module that performs the function). However, in some embodiments, the tuple may include additional or different information. For example, assume the NLU engine 326 receives the recognized speech "Call Greg;" in one embodiment, the NLU engine 326 determines a tuple includes an action (i.e. to place a call), actor (i.e. a phone module) and an entity, also occasionally referred to as an "item," (i.e. Greg as the recipient/target of the call).

In one embodiment, the NLU engine 326 detects one or more of a keyword or short cut. A keyword is a word that gives access directly to a module. For example, when the user says "phone" the phone module is accessed and the phone application is launched (or brought to the foreground). A shortcut is a phrase (e.g. send a message). Examples of keywords and shortcuts may be found in a table 710 of FIG. 7. In some embodiments, the system 100 creates one or more shortcuts based on machine learning, which may be referred to as intent learning. For example, in one embodiment, the system 100 learns that "send Louis a message" should be interpreted by the NLU engine 326 as the user 112 requesting to dictate and send an email (rather than, e.g., an SMS text message) to a contact Louis Monier and proceed directly to an interface to receive voice input dictating the e-mail and established "send Louis a message" as a shortcut.

In one embodiment, the natural language understanding functionality of the NLU engine 326 is modular and the system 100 is agnostic as to the module that performs the natural language understanding. In some embodiments, the modularity allows the NLU module of the NLU engine 326 to be updated frequently to continuously improve accurate understanding or to swap natural language understanding module as new, more accurate natural language understanding systems become available.

When the NLU engine 326 cannot determine the user's intended request (e.g. the request is ambiguous, does not make sense, or the requested action and or action are not available or compatible, a value is missing from the tuple, etc.), the NLU engine 326 initiates a work around. For example, when the user's request is incomplete (e.g. a tuple is not complete), the NLU engine 326 requests that the work around engine 328 (discussed below) prompt the user for additional information. For example, when the user requests "what's on TV?" in one embodiment, the NLU engine 326 determines that a channel and a time are missing and initiates a work around.

In one embodiment, the NLU engine 326 passes a tuple to the connectivity engine 330. For example, the NLU engine 326 is communicatively coupled to a connectivity engine 330 to send the tuple to the connectivity engine 330. In another embodiment, the NLU engine 326 stores the tuple in the storage device 241 (or any other non-transitory storage medium communicatively accessible), and the connectivity engine 330 may be retrieved by accessing the storage device 241 (or other non-transitory storage medium).

In one embodiment, the NLU engine 326 passes a request for additional information to the work around engine 328. For example, the NLU engine 326 is communicatively coupled to the work around engine 328 to send the request for additional information to the work around engine 328. In another embodiment, the NLU engine 326 stores the request for additional information in the storage device 241 (or any other non-transitory storage medium communicatively accessible), and the work around engine 328 retrieves the request for additional information by accessing the storage device 241 (or other non-transitory storage medium).

The work around engine 328 includes code and routines for generating a request for additional information from the user so the NLU engine 326 is able to determine the user's intended request. In one embodiment, the work around engine 328 is a set of instructions executable by the processor 202. In another embodiment, the work around engine 328 is stored in the memory 204 and is accessible and executable by the processor 202. In either embodiment, the work around engine 328 is adapted for cooperation and communication with the processor 202, other components of the server-side connection engine 124 and other components of the system 100.

The work around engine 328 generates a request for additional information so the user's intended request may be understood and executed. In one embodiment, the work around engine 328 generates one or more requests for additional information thereby creating a dialog with the user in order to obtain the additional information. For example, the work around engine 328 generates a request for additional information and sends that request for presentation to the user 112 via the client device (e.g. sends the request to the text to speech engine 111, which presents the request to the user as audio output and/or for display on the client device's display). The user's response is received (e.g. as audio input received by the ASR engine 111 or through another user input device such as a keyboard or touch screen). The NLU engine 326 determines the user's intended request. When the NLU engine 326 still cannot determine the user's intended request, the work around engine 328 generates another request and the process is repeated.

Examples of types of requests for additional information may include, but are not limited to, one or more of a request for whether proposed information is correct, a request for the user to repeat the original request in whole, a request for the user to clarify a portion of the original request, a request for the user to select from a list of options, etc. For clarity and convenience it may be beneficial to discuss the operation of the work around engine 328 in the context of the following scenario. Assume the user requests "navigate to 1234 Fake Street, Any Town, California," However, for whatever reason (e.g. because of background noise, an accent of the user, an error in the speech recognition), the NLU engine 326 understood "navigate" and "California," so the NLU engine 326 does not understand the user's intended request.

In some embodiments, the work around engine 328 generates a request for whether proposed information is correct. In some embodiments, the system 100 proposes additional information based on machine learning. For example, assume that the system learns the user drives to 1234 Fake Street, Any Town, CA each Wednesday; in one embodiment, the work around engine 328 proposes additional information "You said California. Did you want to go to 1234 Fake St., Any Town?" In one embodiment, if the user says "yes," the tuple is complete and navigation to the full address is performed and if the user replies with a "no," the work around engine 328 generates another request (e.g. a request for the user to select from a list of options or spell out the destination).

In some embodiments, the work around engine 328 generates a request for the user to repeat the original request in full. For example, the work around engine 328 generates the request "I'm sorry. I didn't understand. Will you repeat that?" and that request is presented (visually, audibly or both) to the user via the user device 106 and the user may repeat "navigate to 1234 Fake Street, Any Town, California" In one embodiment, the work around engine 328 does not generate a request for the user to repeat the original request and one of the other types of requests is used. In one embodiment, the work around engine 328 limits the number of times it will generate a request for the user to repeat the original request in full based on a predetermined threshold (e.g. 0 or 1). In one such embodiment, responsive to meeting the threshold, the work around engine 328 uses a different type of request for additional information (e.g. prompting the user to select from a list of options).

In some embodiments, the work around engine 328 generates a request for the user to repeat the original request in part or supply information missing from the original request. For example, assume the work around engine 328 determines that "navigate" and "California" were understood and determines that a street address and city are missing and generates the request "I'm sorry. What was the city in California and street address?" so that the user may supply the missing information (which was part of the original request). That request is presented (visually, audibly or both) to the user via the user device 106 and the user may state "1234 Fake Street, Any Town." In one embodiment, the work around engine 328 limits the number of times it will generate a request for the user to repeat the same portion of the original request based on a predetermined threshold (e.g. 0, 1 or 2). In one such embodiment, responsive to meeting the threshold, the work around engine 328 uses a different type of request for additional information (e.g. prompting the user to select from a list of options).

In some embodiments, the work around engine 328 generates a request for the user to select from a list of options, occasionally referred to as a "default list." For example, assume the work around engine 328 determines that "navigate" and "California" were understood and determines that a street address and city are missing and generates the request "What letter does the city of your destination begin with" and generates a list of options such as "A-E is 1, F-J is 2, . . . etc." That request is presented (visually, audibly or both) to the user via the user device 106 and the user may state or select "1" or may select by stating the content of the option "A through E." Since the NLU engine 326 still cannot determine the user's intended request from "navigate," and a California city that begins with a letter between 'a' and 'e' inclusive, the work around engine 328 generates another list of options such as "A is 1, B is 2, . . . etc." That request is presented (visually, audibly or both) to the user via the user device 106 and the user may state or select "1" or may select by the content of the option "A." The work around engine 328 may continue filtering options and generating requests with lists of filtered options until "Any Town" is identified as the city, "Fake Street" is identified as the street and "1234" is identified as the street number.

Depending on the embodiment, the options may be listed visually on the display of the client device, read to the user 112 via the client device 106 using text-to-speech or both. In one embodiment, list options are presented in groups (e.g. in groups of 3-5) at a time. For example, a list of eight options may be presented in two sets as a first set of four options, the user may request the next set by stating "next" and the second set of four options is presented. Limiting the number of options presented at once may reduce the chances the user will be overwhelmed and may enhance usability. In order to navigate lists of options divided into multiple sets, in one embodiment, a user may use commands such as "start" to go to the first set of the list, "end" to go to the end of the list, "next" to go to a next set in the list, and "previous" to go to the previous set in list or "got to _" (e.g. "go to the letter V") to navigate or filter by letter.

In some embodiments, the dialog resulting from the requests of the work around engine 328 may transition between request types in any order. For example, in one embodiment, the work around engine 328 upon the user's selection of an option, the work around engine may prompt the user for the additional information without the list of options. For example, upon receiving/determining that "Any Town" is the city using the list of options as described above, the work around engine 328 generate the request "What is the name of the street in Any Town, CA?," the user may verbally respond with "Fake Street." If the response "Fake Street" is incomprehensible, in one embodiment, the work around engine 328 may request that the user repeat or may request that the user select from a list of options generated by the work around engine 328.

In some embodiments, the requests generated by the work around engine 328 are generated in order to minimize or eliminate a user's need to respond in the negative (e.g. to say "No"). For example, the work around engine 328 generates a list of options for the first letter of the city and requests that the user select the appropriate option rather than sending requests along the lines of "Does the California city start with the letter A?," which would be a yes in the instance of the above example, but such a request is likely to result in a no result in other instances.

It should be recognized that the above "navigate to 1234 Fake St. . . . " example of a use case and that many other use cases exist. For example, assume the user requests "Call Greg" and the user has multiple contacts named Greg in the address book (e.g. Greg R., Greg S. Greg T.); in one embodiment, the work around engine 328 sends a request with a list of options "Which Greg would you like to call? Greg R. is 1. Greg S. is 2. Greg T. is 3." and the user may speak the numeral associated with the desired Greg.

Furthermore, while in the above examples, a portion of the original request was understandable by the NLU engine 326 the actor (i.e. navigation application and phone application, respectively) and a portion of the entity (i.e. California and Greg, respectively), the work around engine 328 may operate when the original request in its entirety was not understandable by the NLU engine 326 or when other portions of a tuple are missing. For example, the work around engine 328 may make one or more requests to obtain the desired actor (e.g. the application the user wants to use), the desired action (e.g. a function or feature of the application), the desired entity (e.g. a target of the action, a recipient of the action, an input for the action, etc.). In one embodiment, the work around engine 328 generates requests at the request of the NLU engine 326 or until the NLU engine 326 has a complete tuple representing the user's intended request. In another example, assume the NLU engine 326 understood the message, but does not understand the actor (e.g. which service in a unified messaging client-email, SMS, Facebook, etc.—to use) and the entity (e.g. the recipient); in one embodiment, the work around engine 328 requests this additional information.

It should be the recognized that the features and functionality discussed above with reference to the work around engine 328 may beneficially provide an automatic troubleshooting mechanism by which the user's intended request may be determined and ultimately executed without the user needing to type out portions of the request (e.g. the user may speak and/or making simple selections via a touch screen or other input), which may be dangerous or illegal in some constrained operating environments (e.g. while driving) and thereby increase the safety of the user 112 and those around the user 112. It should further be recognized that the features and functionality discussed above with reference to the work around engine 328 may beneficially result in more user satisfaction as the system 100 is less likely to "give up" or push the user to a default such as a web search.

In one embodiment, the work around engine 328 passes the request for additional information to one or more of a text-to-speech engine 119 and a graphics engine for displaying content on a client device's display (not shown). In another embodiment, the work around engine 328 stores the request for additional information in the storage device 241 (or any other non-transitory storage medium communicatively accessible). The other components of the system 100 including, e.g., the text-to-speech engine 119 and/or a graphics engine (not shown), can retrieve the request for additional information and send it for presentation to the user 112 via the client device 106 by accessing the storage device 241 (or other non-transitory storage medium).

The connectivity engine 330 includes code and routines for processing the user's intended request. In one embodiment, the connectivity engine 330 is a set of instructions executable by the processor 202. In another embodiment, the connectivity engine 330 is stored in the memory 204 and is accessible and executable by the processor 202. In either embodiment, the connectivity engine 330 is adapted for cooperation and communication with the processor 202, other components of the client device 106 and other components of the system 100.

In one embodiment, the connectivity engine 330 includes a library of modules (not shown). A module may include a set of code and routines that exposes the functionality of an application. For example, a phone module exposes the functionality of a phone application (e.g. place call, receive a call, retrieve voicemail, access a contact list, etc.). In one embodiment, the module exposes the functionality of an application (e.g. a phone application) so that the user may access such functionality on a client device (e.g. a phone) through another client device 106 (e.g. a car). In some embodiments, certain features and functionalities may require the presence of a specific device or device type. For example, in some embodiments, phone or SMS text functionality may not be available through a car unless the car is communicatively coupled with a phone. The library of modules and the modular nature of the modules may facilitate easy updating as applications are updated or as it becomes desirable for the voice and connection engine to interface with new applications.

In some embodiments, when the functionality that will takes a long time to complete (e.g. generating a long report), the agent/assistant will inform the user when the functionality is finished (e.g. TTS, email, SMS text, etc.). In one such embodiment, the system 100 determines the quickest way to get in touch, for example, the system determines the user is logged into Facebook and sends the user a Facebook message stating that the functionality is complete.

In one embodiment, the voice assistant of the system 100 includes one or more modules for interacting with one or more other voice assistants (e.g. Apple's Siri, Microsoft's Cortana, Google's Google Now, etc.). For example, in one embodiment, responsive to the user providing voice input including a shortcut or keyword such as "Search Google Now for X" or "Ask Siri Y," the connectivity module 330 selects the module 330 for connecting to and interacting with Google Now or Siri, respectively, and forwards the query to that voice assistant. In one embodiment, the voice and connection engine 109/124 may monitor the voice inputs for a wake-up word that triggers the personal assistant of the system 100 to resume control of the flow of the user experience (e.g. to resume a dialogue or provide functionality and assistance). Such an embodiment, beneficially allows an entity operating the system 100 to provide its customers access to other voice assistants and their features. For example, a car manufacturer may beneficially allow a customer access the voice assistant of that customer's mobile phone (e.g. Siri when the customer uses an iPhone) or supplement the customers voice assistant options with another voice assistant (e.g. provide access to Google Now and/or Cortana when the customer uses an iPhone).

The connectivity engine 330 processes the user's intended request. In one embodiment, the connectivity engine 330 receives the tuple from the NLU engine 326, determines a module (e.g. phone module) based on the actor (phone) in the tuple and provides the action (e.g. call) and entity/item of the tuple (e.g. Greg) to the determined module and the module causes the actor application to perform the action using the entity/item (e.g. causes the phone application to call Greg).

Example Server-SideVoice and Connection Engine 124

Referring now to FIG. 4, the server-side voice and connection engine 124 is shown in more detail according to one embodiment. In the illustrated embodiment, the server-side voice and connection engine 124 comprises a context agent 422, a context engine 424 and a federation engine 426. It will be recognized that the components 422, 424, 426 comprised in the server-side voice and connection engine 124 are not necessarily all on the same voice and connection server 122. In one embodiment, the modules 422, 424, 426 and/or their functionality are distributed across multiple voice and connection servers 122.

The context agent 422 includes code and routines for synchronizing the context between the client device 106 and the voice and connection server 122 and maintaining synchronization. In one embodiment, the context agent 422 is a set of instructions executable by the processor 202. In another embodiment, the context agent 422 is stored in the memory 204 and is accessible and executable by the processor 202. In either embodiment, the context agent 422 is adapted for cooperation and communication with the processor 202, other components of the voice and connection server 122 (e.g. via bus 206), other components of the system 100 (e.g. client devices 106 via communications unit 208), and other components of the server-side voice and connection engine 124.

As discussed above with reference to the client-side context holder 324, the context agent 422 operates as the server-side context holder and is synchronized with the client side context holder 324. In one embodiment, if the client-side and server-side contexts are not identical the client-side supersedes. The client-side superseding the server-side may be beneficial because the client-side interacts more directly with the user 112 and, therefore, may be more likely to have a more accurate real-time data (e.g. location, luminosity, local time, temperature, speed, etc.) for defining the context since, for example, the associated sensors are located at the client device 106 and network 102 reliability may affect the server-side's ability to maintain an accurate and up-to-date context.

In one embodiment, the context agent 422 passes the current context to the context engine 424. For example the context agent is communicatively coupled to the context engine 424 to send the current context. In one embodiment, the context agent 422 stores the current context in the storage device 241 (or any other non-transitory storage medium communicatively accessible) and the context engine 424 can retrieve the current context by accessing the storage device 241 (or other non-transitory storage medium).

The context engine 424 includes code and routines for generating and maintaining one or more contexts. In one embodiment, the context engine 424 is a set of instructions executable by the processor 202. In another embodiment, the context engine 424 is stored in the memory 204 and is accessible and executable by the processor 202. In either embodiment, the context engine 424 is adapted for cooperation and communication with the processor 202, other components of the server-side voice and connection platform 124 and other components of the system.

In one embodiment, the context engine 424 archives the current context in order to create a history of contexts. Such an embodiment, may be used in conjunction with machine learning to recognize patterns or habits, predict a next step in a workflow, etc. to inform the understanding of the NLU engine 326 or proactively initiate a dialogue. For example, assume user x is a closed profile from a group of user type X; in one embodiment, the context engine 424 detects the difference between x and all others in the group to catch a particular behavior, habit, query, . . . and create proactivity to the user. For example, assume the user is asking for a theater and the context engine 424 detects the other users in the same group like a particular Japanese restaurant; in one embodiment, the system 100 proactively propose that the user to book a reservation at that Japanese restaurant after the feature because the system 100 detected in the schedule of the user that he'll not have time before the movie. In some embodiments, the system 100 may access an API from the restaurant menu (some websites provide this kind of API). The system 100 may understand that the menu or daily specials fit well with the preference of the user and directly read, in the answer of the agent, the menu or daily special to catch the attention of the user.

The federation engine 426 includes code and routines for managing one or more of a user's accounts and client devices 106. In one embodiment, the federation engine 426 is a set of instructions executable by the processor 202. In another embodiment, the federation engine 426 is stored in the memory 204 and is accessible and executable by the processor 202. In either embodiment, the federation engine 426 is adapted for cooperation and communication with the processor 202, other components of the application server 122 and other components of the development application 124.

In one embodiment, the federation engine 426 manages a unified identity. A unified identity may include, but is not limited to, one or more of a user's accounts (e.g. Facebook, Google+, Twitter, etc.), the user's client devices 106 (e.g. tablet, mobile phone, TV, car, etc.), previous voice inputs and dialogues, etc. in order to enhance user experience based on the user's social networks and/or habits. A unified identity provides aggregated information about the user, which may enhance features and functionality of the system 100. For example, assume the user 112 provides the input "I need gas." In one embodiment, the access to the aggregated data of the unified identity may allow the system 100 to understand that the user's intended request is for directions to a gas station and that gas station should be on the user's way to a favorite bar (e.g. to a brand of gas station to which the user is loyal, that has the lowest gas price, that is in the direction of travel along the way to the bar even if there's a closer gas station behind the user or closer but out of the way from where the system 100 determines the user is heading because it is after 6 pm on a Friday and the aggregated data indicates that the user heads to a favorite bar after work on Friday). In another example, the system 100 may use aggregated data to select and direct a user to a particular restaurant (e.g. based on aggregated data such as previous reservations made using a service like open table, the user's restaurant reviews on yelp, and previous voice queries and dialogues between the user 112 and the system 100 regarding food).

The federation engine 426 manages the user's devices to coordinate a user's transition from one client device 106 to another. For example, assume the user 112 via the user's tablet (i.e. a client device 106) has requested today's headlines and the system 100 begins reading the headlines to the user 112. Also assume that the user 112 then realizes he/she is going to be late for work and requests cessation of the reading of headlines. In one embodiment, the federation engine 426 manages the user's transition from the tablet to the user's automobile (i.e. another client device 106), so that the user 112, once in the car may request that the system 100 continue and the system 100 will continue reading the headlines from where it left off with the tablet. The federation engine 426 may also propose and manage a transition to the user's mobile phone (i.e. yet another client device 106) when the user arrives at work. Such embodiments, beneficially provide continuity of service, or "continuous service," from one client device 106 to another. In another example, the user may plan a road trip via a tablet on the sofa and have the route mapped in the navigation system of the car. In one embodiment, the system 100 may recognize that the user has a habit of reviewing headlines prior to work and continuing in the car on the way to work and may prompt the user on the tablet when it is time to leave for work (perhaps based on real-time traffic condition data) and ask whether the user would like to resume the headlines in the car.

In one embodiment, the federation engine 426 passes a context from one client device 106 to another in order to manage a transition to the recipient device. For example, the federation engine 426 is communicatively coupled to the client-side context holder 324 of the recipient device. In another embodiment, the federation engine 426 stores the current context in the storage device 241 of the server 122 (or any other non-transitory storage medium communicatively accessible) and the client-side context holder 324 of the recipient device 106 may retrieve the current context by accessing the storage device 241 (or other non-transitory storage medium).

Example Methods

Figure 5:
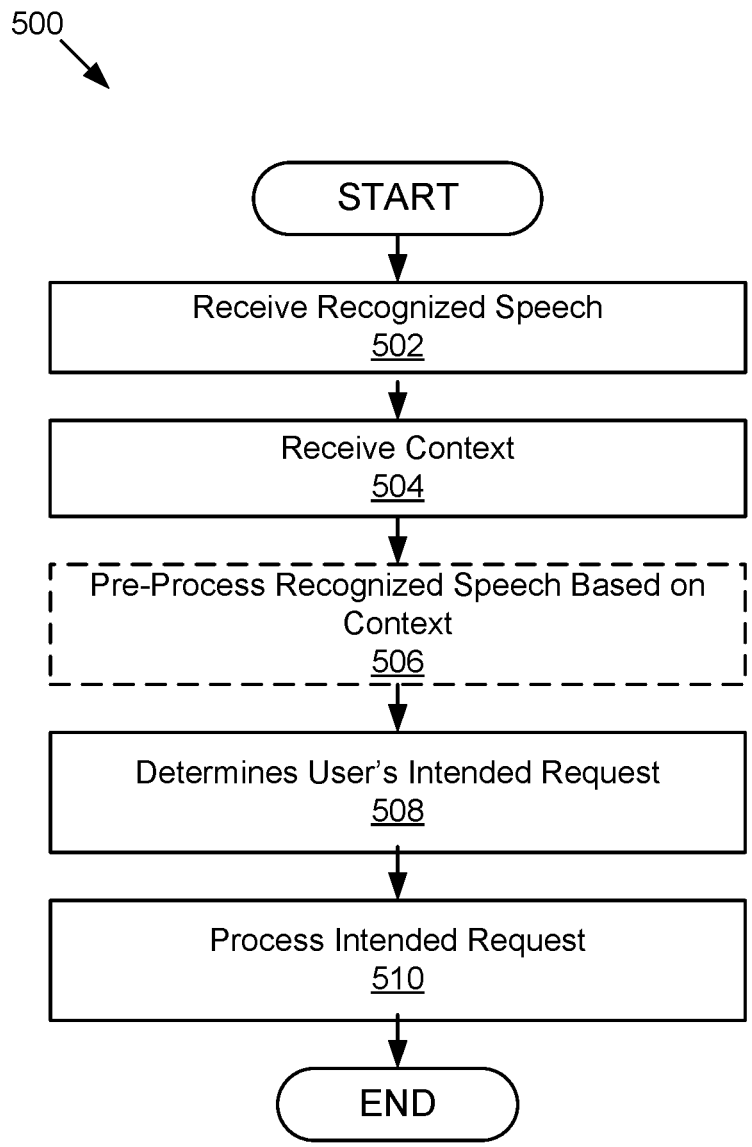
FIG. 5 is a flowchart of an example method for receiving and processing a request using the voice and connection platform according to some embodiments.
Figure 6:
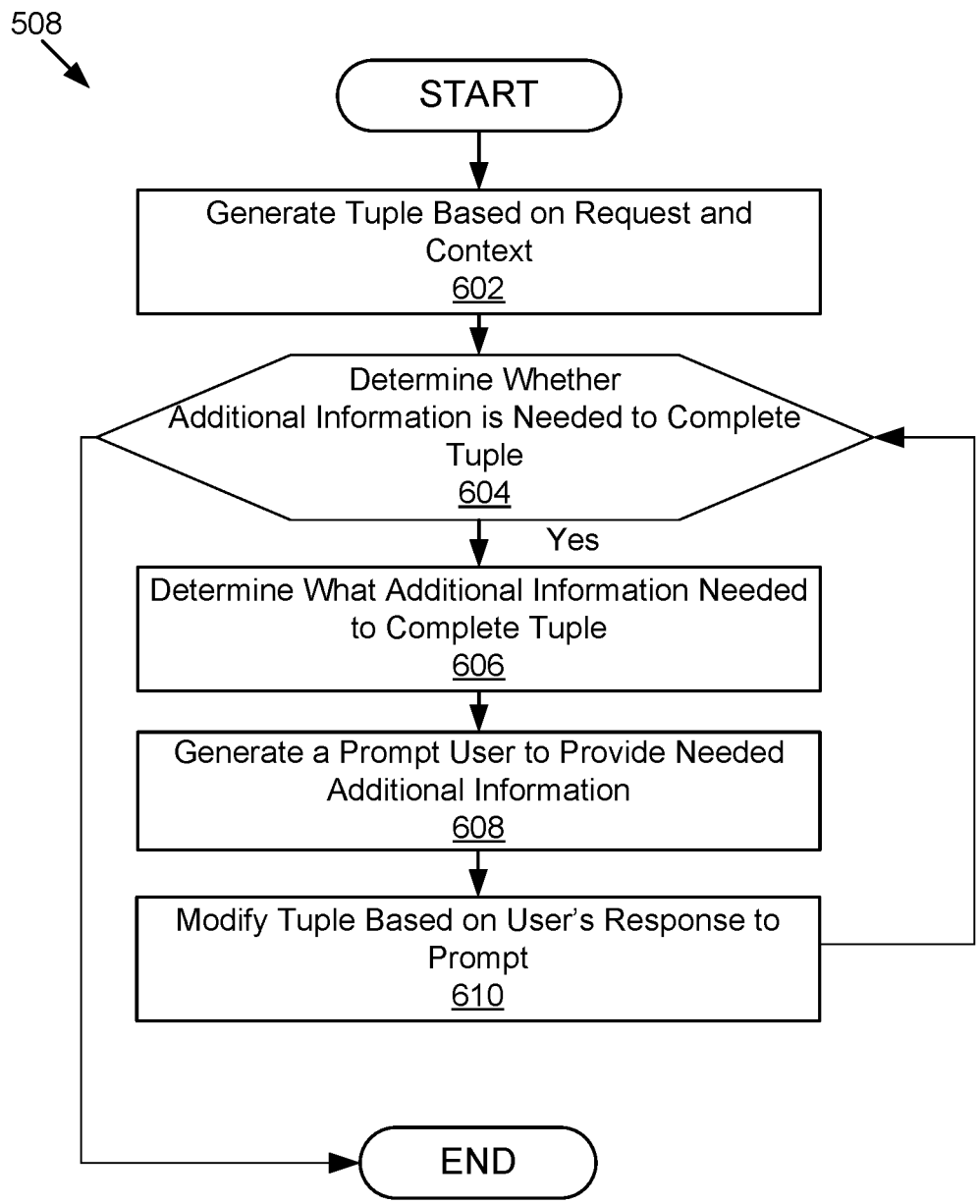
FIG. 6 is a flowchart of an example method for obtaining additional information to determine a user's intended request according to some embodiments.
Figure 7:
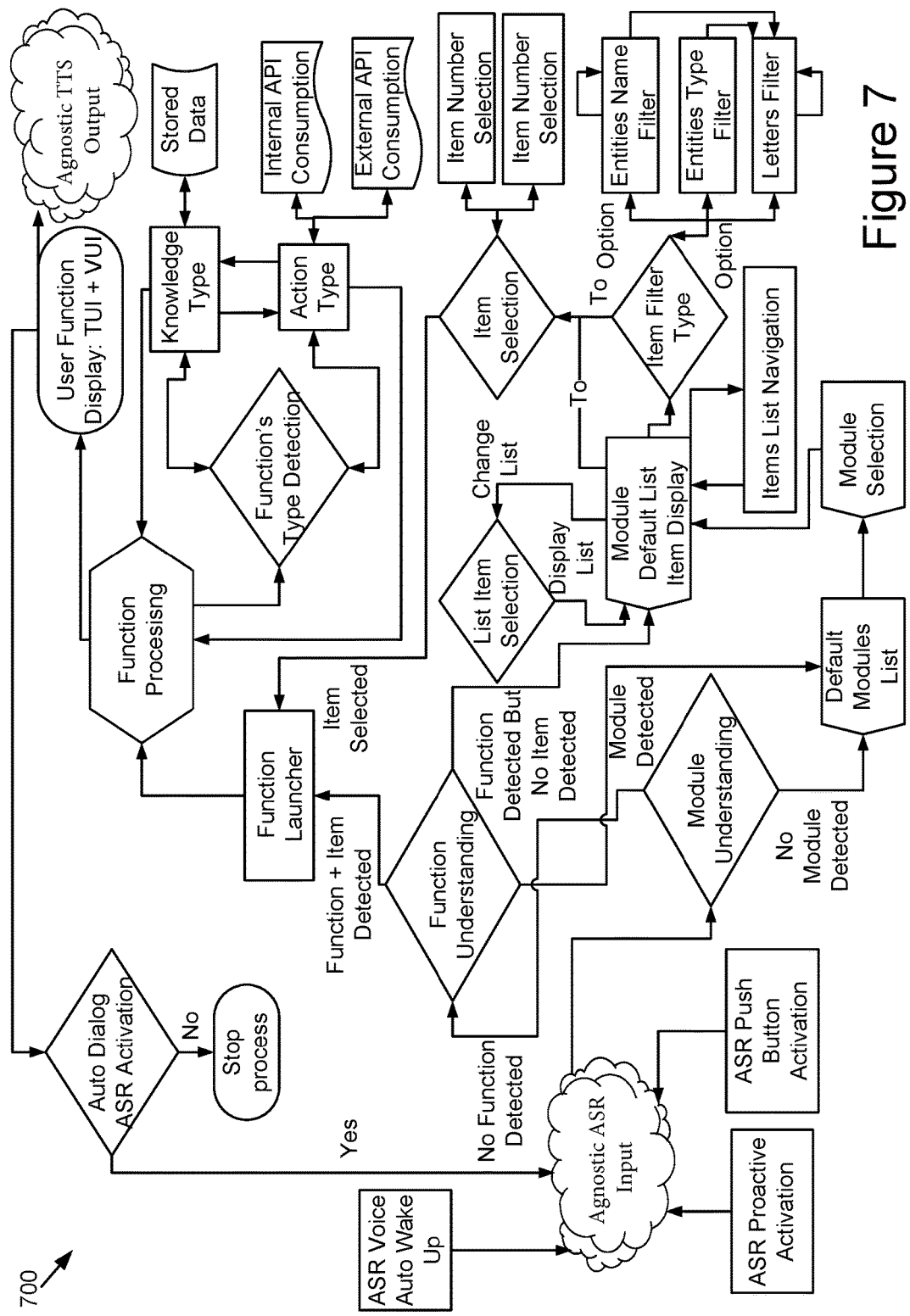
FIG. 7 is an example method for receiving and processing a request using the voice and connection platform according to another embodiment.

FIGS. 5, 6 and 7 depict various methods 500, 508, 700 performed by the system described above in reference to FIGS. 1-4.

Referring to FIG. 5, an example method 500 for receiving and processing a request using the voice and connection platform according to one embodiment is shown. At block 502, the NLU engine 326 receives recognized speech. At block 504, the NLU engine 326 receives context. At block 506, the NLU engine 326 optionally pre-processes the recognized speech based on the context received at block 504. At block 508, the NLU engine 326 determines the user's intended request. At block 510, the connectivity engine processes the intended request and the method 500 ends.

Referring to FIG. 6 an example method 508 for determining a user's intended request according to one embodiment is shown. At block 602, the NLU engine 326 generates a tuple based on a user's request and context. At block 604, the NLU engine 326 determines whether additional information is needed to complete the tuple. When the NLU engine 326 determines that additional information is not needed to complete the tuple (604—No), the method 508 ends. When the NLU engine 326 determines that additional information is needed to complete the tuple (604—Yes), the method 508 continues at block 606.

At block 606, the work around engine 328 determines what additional information is needed to complete the tuple and, at block 608, generates a prompt for the user to provide the needed additional information. At block 610, the NLU engine 326 modifies the tuple based on the user's response to the prompt generated at block 610 and the method continues at block 604 and the blocks 604, 606, 608 and 610 are repeated until the NLU engine 326 determines that additional information is not needed to complete the tuple (604—No) and the method 508 ends.

Referring to FIG. 7, an example method 700 for receiving and processing a request using the voice and connection platform according to another embodiment is shown.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, the engines, modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   detecting an event;
   responsive to detecting the event, proactively initiating a dialogue of a voice assistant on a first user device with a user;
   responsive to initiating the dialogue with the user, receiving, at the first user device, a first audio input associated with the dialogue from the user requesting a first action;
   performing automatic speech recognition on the first audio input;
   determining, at the first user device, a first context of the user;
   determining a first tuple describing user intent, the first tuple including the first action and an actor associated with the first action, the first tuple determined by performing natural language understanding based on the automatic speech recognition of the first audio input;
   initiating the first action on the first user device based on the first tuple;
   subsequent to initiating the first action, receiving a second audio input from the user requesting a second action unrelated to the first action;
   initiating the second action;
   subsequent to initiating the second action, receiving, at a second user device distinct from the first user device, a third audio input from the user continuing the dialogue and requesting a third action related to the first action, the third audio input missing information for completing a third tuple, the third tuple for initiating the third action;
   obtaining the missing information using the first context to complete the third tuple associated with the third action; and
   initiating the third action on the second user device based on the third tuple.

2. The computer-implemented method of claim 1, wherein the event is an internal event.

3. The computer-implemented method of claim 1, further comprising:
   initiating the voice assistant without a user input and receiving the first audio input from the user subsequent to an initiation of the voice assistant.

4. The computer-implemented method of claim 1, wherein the first context includes one or more of a context history, a dialogue history, a user profile, a user history, a location, and a current context domain.

5. The computer-implemented method of claim 1, wherein the missing information is one or more of the third action, an actor associated with the third action, and an entity associated with the third action.

6. The computer-implemented method of claim 1, further comprising:
   determining that the first context and the first audio input are missing first information used to initiate the first action;
   determining what information is the missing first information; and
   prompting the user to provide an audio input supplying the missing first information.

7. The computer-implemented method of claim 1, further comprising:
   determining that first information used to initiate the first action is unable to be obtained from the first audio input;
   determining what information is the missing first information; and
   prompting the user to provide an audio input supplying the missing first information unable to be obtained from the first audio input.

8. The computer-implemented method of claim 1, further comprising:
   determining that first information used to initiate the first action is unable to be obtained from the first audio input;
   determining what information is the missing first information;
   providing for selection by the user a plurality of options, an option supplying potential information for completing the first action; and
   receiving an audio input selecting a first option from the plurality of options.

9. The computer-implemented method of claim 1, wherein the second action unrelated to the first action is associated with a second context, and the first action and the third action are associated with the first context.

10. A system comprising:
one or more processors; and
a memory storing instructions that when executed by the one or more processors, cause the system to perform steps including:
detect an event;
responsive to detecting the event, proactively initiate a dialogue of a voice assistant on a first user device with a user;
responsive to initiating the dialogue with the user, receive, at the first user device, a first audio input associated with the dialogue from the user requesting a first action;
perform automatic speech recognition on the first audio input;
determine, at the first user device, a first context of the user;
determine a first tuple describing user intent, the first tuple including the first action and an actor associated with the first action, the first tuple determined by performing natural language understanding based on the automatic speech recognition of the first audio input;
initiate the first action on the first user device based on the first tuple;
subsequent to initiating the first action, receive a second audio input from the user requesting a second action unrelated to the first action;
initiate the second action;
subsequent to initiating the second action, receive, at a second user device distinct from the first user device a third audio input from the user continuing the dialogue and requesting a third action related to the first action, the third audio input missing information for completing a third tuple, the third tuple for initiating the third action;
obtaining the missing information using the first context to complete the third tuple associated with the third action; and
initiating the third action on the second user device based on the third tuple.

11. The system of claim 10, wherein the event is an internal event.

12. The system of claim 10, wherein the instructions, when executed by the one or more processors, cause the system to:
initiate the voice assistant without a user input and receiving the first audio input from the user subsequent to an initiation of the voice assistant.

13. The system of claim 10, wherein the first context includes one or more of a context history, a dialogue history, a user profile, a user history, a location, and a current context domain.

14. The system of claim 10, wherein the missing information is one or more of the third action, an actor associated with the third action, and an entity associated with the third action.

15. The system of claim 10, wherein the instructions, when executed by the one or more processors cause the system to:
determine that the first context and the first audio input are missing first information used to initiate the first action;
determine what information is the missing first information; and
prompt the user to provide an audio input supplying the missing first information.

16. The system of claim 10, wherein the instructions, when executed by the one or more processors, cause the system to:
determine that first information used to initiate the first action is unable to be obtained from the first audio input;
determine what information is the missing first information; and
prompt the user to provide an audio input supplying the missing first information unable to be obtained from the first audio input.

17. The system of claim 10, wherein the instructions, when executed by the one or more processors, cause the system to:
determine that first information used to initiate the first action is unable to be obtained from the first audio input;
determine what information is the missing first information;
provide for selection by the user a plurality of options, an option supplying potential information for completing the first action; and
receive an audio input selecting a first option from the plurality of options.

18. The system of claim 10, wherein the second action unrelated to the first action is associated with a second context, and the first action and the third action are associated with the first context.

* * * * *